US012687866B2

(12) United States Patent
Hua et al.

(10) Patent No.: US 12,687,866 B2
(45) Date of Patent: Jul. 21, 2026

(54) SYSTEM AND METHOD FOR CONTROLLING FACE VELOCITY OF A FUME HOOD

(71) Applicant: Honeywell International Inc., Charlotte, NC (US)

(72) Inventors: Wei Hua, Acton, MA (US); James M. Barrette, Ashburnham, MA (US); David R. Boisvert, North Chelmsford, MA (US); Liwen Yu, Acton, MA (US); Robert S. Klamka, Westford, MA (US); Mason R. Walls, Hudson, MA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 481 days.

(21) Appl. No.: 18/127,618

(22) Filed: Mar. 28, 2023

(65) Prior Publication Data

US 2024/0329670 A1 Oct. 3, 2024

(51) Int. Cl.
*B08B 15/02* (2006.01)
*F24F 11/77* (2018.01)
*G05D 7/06* (2006.01)

(52) U.S. Cl.
CPC ......... *G05D 7/0676* (2013.01); *B08B 15/023* (2013.01); *F24F 11/77* (2018.01); *G05B 2219/2614* (2013.01)

(58) Field of Classification Search
CPC ..... G05D 7/0676; B08B 15/023; F24F 11/77; G05B 2219/2614
See application file for complete search history.

(56) References Cited

U.S. PATENT DOCUMENTS

| | | | |
|---|---|---|---|
| 4,150,606 | A | 4/1979 | Nelson |
| 4,155,289 | A | 5/1979 | Garriss |
| 4,466,341 | A | 8/1984 | Grogan |
| 4,502,375 | A | 3/1985 | Hignite et al. |
| 4,528,898 | A | 7/1985 | Sharp et al. |

(Continued)

FOREIGN PATENT DOCUMENTS

| | | |
|---|---|---|
| AU | B6373090 | 5/1991 |
| CN | 105149313 A | 12/2015 |

(Continued)

OTHER PUBLICATIONS

Antec Curve Advanced Cloud Based Monitoring, Antec Controls, 4 pages, 2022.

(Continued)

*Primary Examiner* — Michael W Choi
(74) *Attorney, Agent, or Firm* — Seager, Tufte & Wickhem, LLP

(57) ABSTRACT

A system for controlling a face velocity of a fume hood includes one or more sensors that are configured to detect one or more users in front of the fume hood. A controller is configured to determine a desired ventilation airflow rate for the fume hood based at least in part on the one or more users detected by the one or more sensors, wherein the desired ventilation airflow rate corresponds to one of three more available ventilation airflow rates. The controller is configured to provide a control signal to a ventilation device of the fume hood, wherein the control signal corresponds to the desired face velocity.

18 Claims, 11 Drawing Sheets

To FIG. 2B

(56) References Cited

U.S. PATENT DOCUMENTS

| | | | |
|---|---|---|---|
| 4,706,553 | A | 11/1987 | Sharp et al. |
| 4,773,311 | A | 9/1988 | Sharp |
| 4,893,551 | A | 1/1990 | Sharp et al. |
| 4,934,256 | A | 6/1990 | Moss et al. |
| 5,092,227 | A | 3/1992 | Ahmed et al. |
| 5,115,728 | A | 5/1992 | Ahmed et al. |
| 5,117,746 | A | 6/1992 | Sharp |
| 5,170,673 | A | 12/1992 | Ahmed et al. |
| 5,215,497 | A | 6/1993 | Drees |
| 5,240,455 | A | 8/1993 | Sharp |
| 5,262,578 | A | 11/1993 | Hall |
| 5,385,505 | A | 1/1995 | Sharp et al. |
| 5,406,073 | A | 4/1995 | Sharp et al. |
| 5,439,414 | A | 8/1995 | Jacob |
| 5,450,873 | A | 9/1995 | Palmer |
| 5,545,086 | A | 8/1996 | Sharp et al. |
| 5,562,537 | A | 10/1996 | Zver et al. |
| 5,733,188 | A | 3/1998 | Jacob |
| 5,882,254 | A | 3/1999 | Jacob |
| 6,137,403 | A | 10/2000 | Desrochers et al. |
| 6,252,689 | B1 | 6/2001 | Sharp |
| 6,739,967 | B2 | 5/2004 | Saito et al. |
| 6,909,921 | B1 | 6/2005 | Bilger |
| 6,914,532 | B2 | 7/2005 | Crooks et al. |
| 6,935,943 | B2 | 8/2005 | Desai |
| 6,960,126 | B2 | 11/2005 | Desai |
| 6,994,619 | B2 | 2/2006 | Scholten |
| 7,532,541 | B2 | 5/2009 | Govindswamy et al. |
| 7,994,480 | B2 | 8/2011 | Johnson et al. |
| 9,694,398 | B2 | 7/2017 | Stakutis et al. |
| 2004/0072529 | A1 | 4/2004 | Desai |
| 2004/0209564 | A1 | 10/2004 | Desai |
| 2005/0024216 | A1 | 2/2005 | Crooks et al. |
| 2005/0048900 | A1 | 3/2005 | Scholten |
| 2006/0079164 | A1 | 4/2006 | DeCastro et al. |
| 2007/0065134 | A1 | 3/2007 | Sugimoto |
| 2009/0191803 | A1 | 7/2009 | Barrette et al. |
| 2010/0265316 | A1 | 10/2010 | Sali et al. |
| 2011/0164032 | A1 | 7/2011 | Shadmi |
| 2012/0052792 | A1 | 3/2012 | Sinur et al. |
| 2013/0002845 | A1 | 1/2013 | Fedorenko et al. |
| 2014/0094106 | A1 | 4/2014 | Mcilhany |
| 2014/0120819 | A1* | 5/2014 | Stakutis ................ B08B 15/023 |
| | | | 454/56 |
| 2021/0291242 | A1 | 9/2021 | Desrochers |
| 2022/0307907 | A1* | 9/2022 | Shayne ................... G01J 5/025 |
| 2024/0009715 | A1* | 1/2024 | Desrochers ........... B08B 15/023 |

FOREIGN PATENT DOCUMENTS

| | | | | | |
|---|---|---|---|---|---|
| CN | 109426524 | A | | 3/2019 | |
| CN | 110094782 | A | * | 8/2019 | .......... F24C 15/2021 |
| CN | 212821674 | U | | 3/2021 | |
| CN | 113033316 | A | | 6/2021 | |
| CN | 114740774 | A | | 7/2022 | |
| DE | 10028333 | A1 | | 12/2001 | |
| EP | 0541864 | A1 | | 5/1993 | |
| EP | 1745866 | A1 | | 1/2007 | |
| JP | 2004069121 | A | | 3/2004 | |
| JP | 3676767 | B2 | * | 7/2005 | |
| KR | 20220075154 | A | | 6/2022 | |
| WO | 9113700 | A1 | | 9/1991 | |
| WO | 9513146 | A1 | | 5/1995 | |
| WO | 0033983 | A1 | | 6/2000 | |

OTHER PUBLICATIONS

Apex Premier High Performance Velocity Monitor, Accutrol LLC Product Sheet, 4 pages, 2022.
Apex High Performance Velocity Alarm Accutrol LLC Product Sheet, 4 pages, 2022.
AVC Fume Hood Control System, Accutrol, LLC Product Sheet, 4 pages, 2022.

Demystifying Fume Hood Control Systems with a Simple, Intuitive User Interface, Accutrol, LLC, 5 pages, 2022.
Touchscreen FHM3, Fume Hood Monitor, Accutrol, LLC, Product Sheet, 2 pages, 2022.
Fume Hood Brochure, Confidence in Managing Laboratory Fume Hoods, Eurotherm, 8 pages, 2021.
"The Technology Behind the Microsoft xBox Motion Control System," 2 pages, Printed Sep. 1, 2011.
Hakansson et al., "Sound Focusing by Flat Acoustic Lenses without Negative Infraction," Applied Physics Letters, American institute of Physics, vol. 86, 3 pages, Downloaded Jan. 25, 2005, 054102-1, http://apl.aip.org/spl/copyright.jsp.
Holland et al., "Air Couples Acoustic Imaging with Zero-Group-Velocity Lamb Modes," Applied Physics Letters, vol. 83, No. 13, pp. 2704-2706, Sep. 29, 2003.
I.D.E.A. Prime Sense 3D Sensor, Blog Archive, 2 pages, Printed 2012.
Keegan@TI, How Mmwave Sensors Create Technology Advantages for Independent "Assisted" Living, e2@ti.com/blogs, 4 pages, Jan. 18, 2022. Accessed Mar. 3, 2023.
Low-Power, High-Sensitivty Infrared Sensor for Presence and Motion Motion Detection, Data Brief, ST Microelctronics, STHS34PF80, 13 pages, 2021.
Hood Presence Sensor ZPS-H, Accutrol, LLC Product Sheet, Oct. 2018.
Cava Manual, v105 Touchscreen Fume Hood Controller, Antec Controls, 27 pages, 2022.
MVM Manual v126, Multi-Variable Monitor, Antec Controls, 42 pages, 2022.
Pace Manual, v111, Critical Space Controller, Antec Controls,23 pages, 2022.
PMT Manual, v114, Touchscreen Room Pressure Monitor, 35 pages, 2022.
Mukhopadhyay et al., "Synthetic Aperture Sonar 3-D Imaging of Targets in Air using Multiple, non-Parallel Shot Lines," 2005 IEEE International Geoscience and Remote Sensing Symposium, vol. 1, 4 pages, Jul. 25-29, 2005 IBSN:0-7803-9050-4.
Murino, "Reconstruction and Segmentation of Underwater Acoustic Images Combining Confidence Information in MRF models," Pattern Recognition, vol. 34, pp. 981-997, 2001.
Open NI™, "Program Guide," Printed 2012, 21 pages.
Patel, "Segmentation of 3D Acoustic Images for Object Recognition Purposes," University College London,5 pages, before May 2013.
International Search Report and Written Opinion for International Application No. PCT/US2013/062991 11 pages, mailing date Dec. 26, 2013.
Phoenix Controls Corporation, "Sash Sensors," Jul. 2000.
Phoenix Controls Corporation, Laboratory Guide Specification X30 Fume Hood Monitor and Zone Presence Sensor (ZPS) 200 Series, 2 pages, Mar. 2006.
Phoenix Controls Corporation X30 Series Fume Hood Monitors, 13 pages, Feb. 2005.
Phoenix Controls Corporation, X30 Fume Hood Monitors, 15 pages, Jun. 2006.
Phoenix Controls Corporation, X30 Fume Hood Monitors Users Manual , 18 pages, Jun. 2006.
Scientific Equipment & Furniture Association, "Recommended Practices for Laboratory Fume Hoods," SEFA Desk Reference, Revision 1,pp. 57-135, 2006.
Siemens, Fume Hood Monitor, Technical Specification Sheet, Rev. 2, 4 pages, Apr. 2001.
Siemens Fume Hood Operating Display Panel,12 pages, 2020.
Siemens Fume Hood Operating Display—Thin and Flush Mount, 11 pages. 2020.
"Fume Hoods", Stanford Laboratory Standard and Design, 24 pages, 2005.
Stenholt, "Stereo Rendering," Powerpoint Presentation, 45 slides, Before Jun. 2013.
Texas Instruments, 1WR6843AOP Single Chip 60 to 64 GHz mmWave Sensor Antennas-On-Package (AOP), 81 pages, Apr. 2020, Revised Jul. 2022.
Time of Flight 8×8 Multizone Ranging Sensor with Wide Field of View, VL53I5Cx Datasheet, 38 pages, 2023.

(56)  References Cited

OTHER PUBLICATIONS

Area Presence Sensor ZPS-A, Accutrol LLC Product Sheet, 2 pages, 2022.
Hood Presence Sensor, Accutrol, LLC Product Sheet, 2 pages 2022.

* cited by examiner

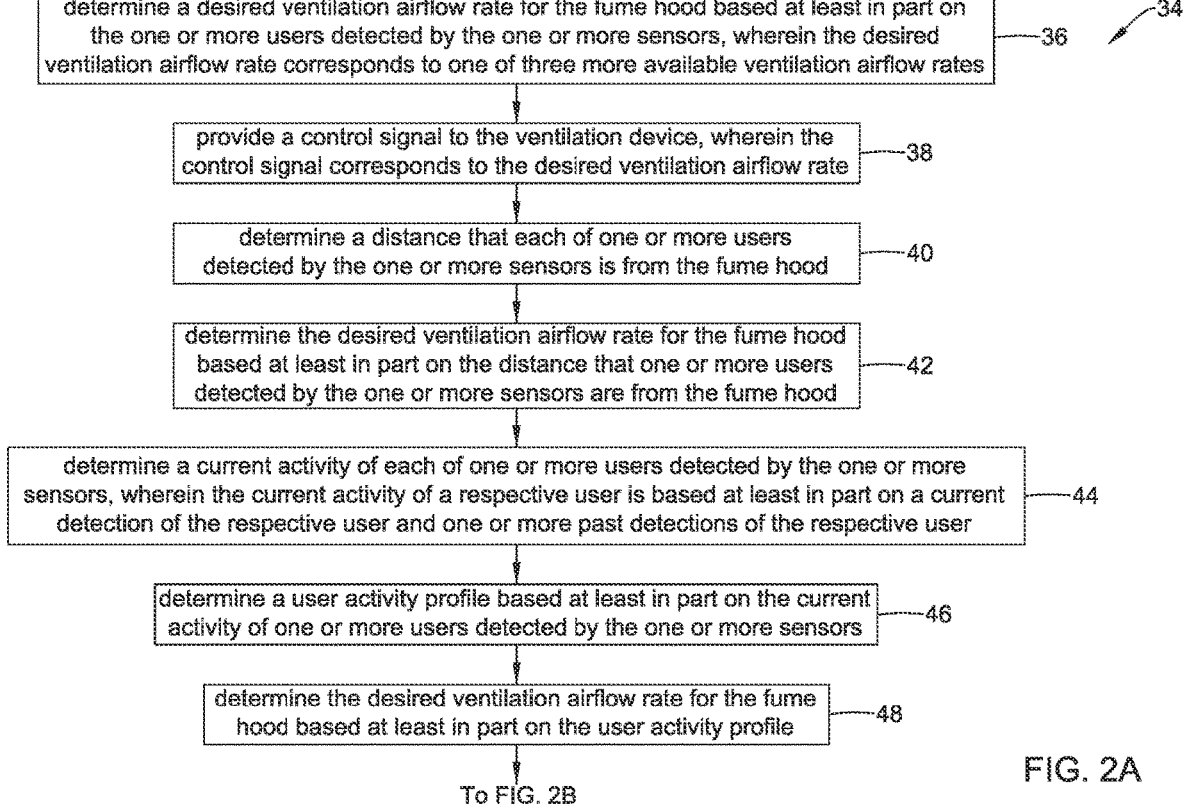

determine a desired ventilation airflow rate for the fume hood based at least in part on the one or more users detected by the one or more sensors, wherein the desired ventilation airflow rate corresponds to one of three more available ventilation airflow rates — 36    /—34 provide a control signal to the ventilation device, wherein the control signal corresponds to the desired ventilation airflow rate — 38 determine a distance that each of one or more users detected by the one or more sensors is from the fume hood — 40 determine the desired ventilation airflow rate for the fume hood based at least in part on the distance that one or more users detected by the one or more sensors are from the fume hood — 42 determine a current activity of each of one or more users detected by the one or more sensors, wherein the current activity of a respective user is based at least in part on a current detection of the respective user and one or more past detections of the respective user — 44 determine a user activity profile based at least in part on the current activity of one or more users detected by the one or more sensors — 46 determine the desired ventilation airflow rate for the fume hood based at least in part on the user activity profile — 48

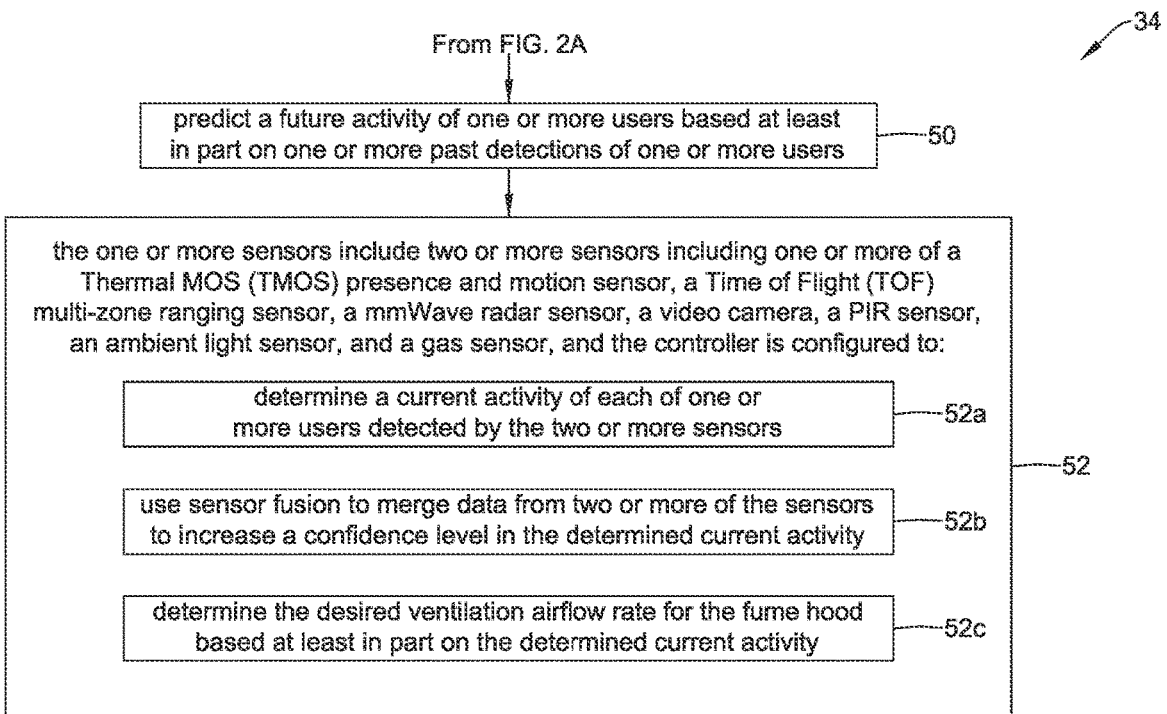

From FIG. 2A predict a future activity of one or more users based at least
in part on one or more past detections of one or more users — 50 the one or more sensors include two or more sensors including one or more of a
Thermal MOS (TMOS) presence and motion sensor, a Time of Flight (TOF)
multi-zone ranging sensor, a mmWave radar sensor, a video camera, a PIR sensor,
an ambient light sensor, and a gas sensor, and the controller is configured to:

determine a current activity of each of one or
more users detected by the two or more sensors — 52a use sensor fusion to merge data from two or more of the sensors
to increase a confidence level in the determined current activity — 52b determine the desired ventilation airflow rate for the fume hood
based at least in part on the determined current activity — 52c

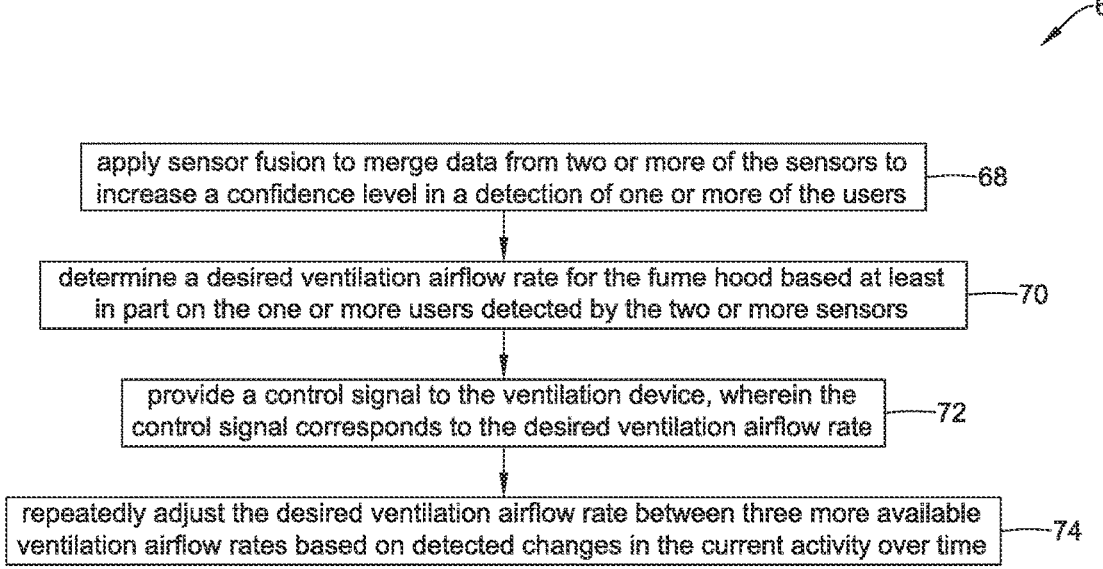

66 apply sensor fusion to merge data from two or more of the sensors to
increase a confidence level in a detection of one or more of the users — 68 determine a desired ventilation airflow rate for the fume hood based at least
in part on the one or more users detected by the two or more sensors — 70 provide a control signal to the ventilation device, wherein the
control signal corresponds to the desired ventilation airflow rate — 72 repeatedly adjust the desired ventilation airflow rate between three more available
ventilation airflow rates based on detected changes in the current activity over time — 74

FIG. 4

SYSTEM AND METHOD FOR CONTROLLING FACE VELOCITY OF A FUME HOOD

TECHNICAL FIELD

The present disclosure relates generally to fume hoods, and more particularly to systems and methods for controlling face velocity of a fume hood.

BACKGROUND

Fume hoods are commonly used when personnel are handling potentially harmful materials, particularly substances that give off noxious fumes. Fume hoods can often be found in educational, industrial, medical and government laboratories and production facilities. A typical fume hood may include a housing within which the harmful materials may be stored and used. Users typically access the interior of the fume hood housing through an opening, which in some cases, may be selectively opened and closed via one or more movable sashes or the like. The fume hood housing is typically vented by a ventilation device so that air and potentially harmful gases or other materials within the housing are positively exhausted out of the building through ductwork. Such venting typically draws fresh air in through the fume hood opening, which helps keep any potentially harmful materials within the fume hood and out of the space where personnel may be located.

Proper control of the airflow through a fume hood may be important for safety, cost, comfort and/or other reasons. For example, if airflow through the fume hood opening is too low (e.g., the face velocity of air flowing through the opening is too low), contaminants inside the fume hood may have an opportunity to exit the fume hood. This may present a safety issue. However, maintaining a high volume airflow through the fume hood at all times may be wasteful because unnecessarily large volumes of conditioned air (e.g., cooled or heated air) within the building may be drawn into the fume hood and exhausted. As a result, additional air must be conditioned and supplied to the building to replace the exhausted air.

SUMMARY

The disclosure relates generally to fume hoods, and more particularly to systems for controlling a fume hood airflow based on detected users in or around the fume hood. An example may be found in a system for controlling a ventilation device of a fume hood. The illustrative system includes one or more sensors that are configured to detect one or more users in front of the fume hood, and a controller that is operatively coupled to the one or more sensors. The controller is configured to determine a desired ventilation airflow rate for the fume hood based at least in part on the one or more users detected by the one or more sensors, wherein the desired ventilation airflow rate corresponds to one of three or more available ventilation airflow rates. In some cases, the available ventilation airflow rates are variable between a minimum available ventilation airflow rate and a maximum available ventilation airflow rate, with a plurality of intermediate available ventilation airflow rates between the minimum available ventilation airflow rate and the maximum available ventilation airflow rate. The controller is configured to provide a control signal to the ventilation device, wherein the control signal corresponds to the desired ventilation airflow rate.

Another example may be found in a system for controlling a ventilation device of a fume hood. The illustrative system includes one or more sensors that are configured to detect one or more users in front of the fume hood, and a controller that is operatively coupled to the one or more sensors. The controller is configured to determine a current activity of each of one or more users detected by the one or more sensors, wherein the current activity of each respective user is based at least in part on a current detection of the respective user and one or more past detections of the respective user. The controller may determine a desired ventilation airflow rate for the fume hood based at least in part on the current activity of one or more of the users detected by the one or more sensors. The controller is configured to provide a control signal to the ventilation device, wherein the control signal corresponds to the desired ventilation airflow rate.

Another example may be found in a system for controlling a ventilation device of a fume hood. The illustrative system includes two or more sensors that are configured to detect one or more users in front of the fume hood, as well as a controller that is operatively coupled to the two or more sensors. The controller is configured to apply sensor fusion to merge data from two or more of the sensors to increase a confidence level in a detection of one or more of the users. The controller determines a desired ventilation airflow rate for the fume hood based at least in part on the one or more users detected by the two or more sensors. The controller is configured to provide a control signal to the ventilation device, wherein the control signal corresponds to the desired ventilation airflow rate.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which:

FIGS. 2A and 2B are flow diagrams that together show an illustrative series of steps that a controller forming part of the illustrative fume hood system of FIG. 1 may carry out;

FIG. 4 is a flow diagram showing an illustrative series of steps that a controller forming part of the illustrative fume hood system of FIG. 1 may carry out;

Figure 1:
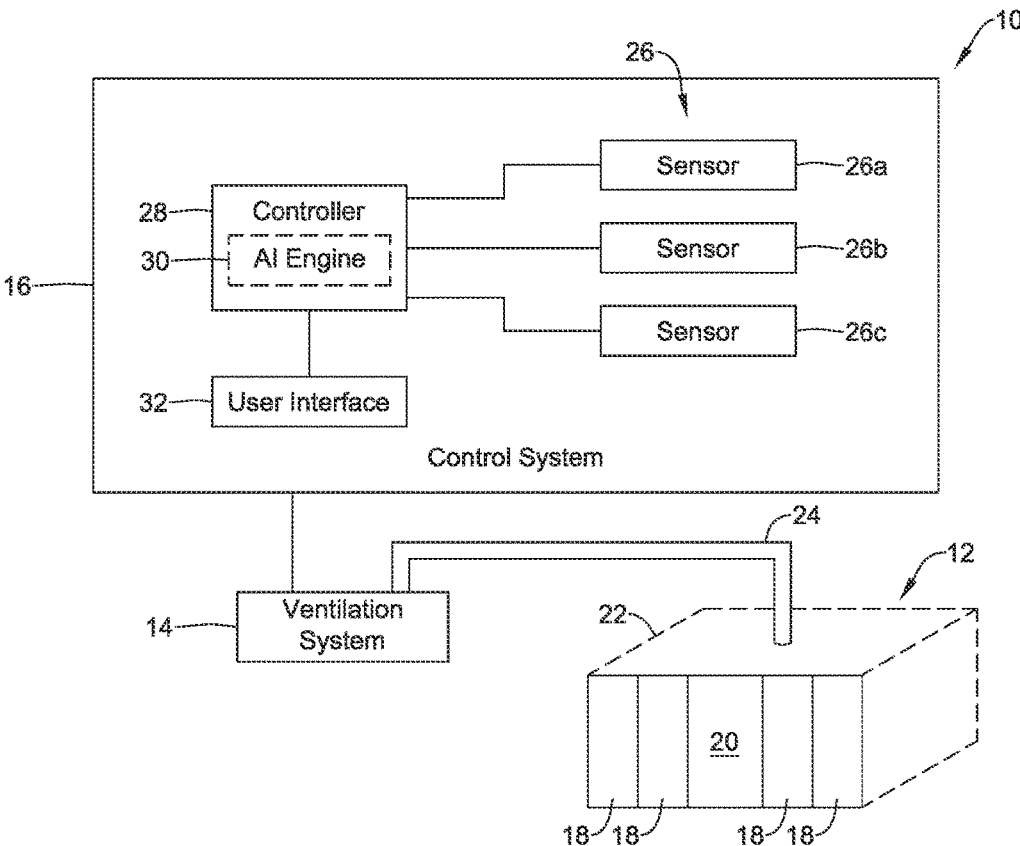
FIG. 1 is a schematic block diagram of an illustrative fume hood system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several illustrative embodiments which are meant to be illustrative in nature.

FIG. 1 is a schematic block diagram showing an illustrative fume hood system 10. The illustrative fume hood system 10 includes a fume hood 12, a ventilation system 14 and a control system 16. The fume hood 12 may include one or more moveable sashes 18 (a total of four are shown) that are mechanically coupled to the fume hood 12. The one or more moveable sashes 18 may be moved back and forth in order to either increase or decrease a size of an opening 20 that is formed between the one or more moveable sashes 18. In some instances, particularly when there are multiple moveable sashes 18, the moveable sashes 18 may travel within one or more tracks that are disposed at or near a front of the fume hood 12. This is just an example fume hood configuration.

The fume hood 12 may be used in, for example, educational, industrial, medical (e.g. biological safety cabinets) and/or government facilities to help facilitate handling of potentially harmful materials, particularly substances that emit noxious fumes or may include pathogens or other harmful agents. In some instances, the fume hood 12 may include a housing and/or enclosure 22 within which materials may be stored, examined, and/or used. Users may access an interior of the housing and/or enclosure 22 via the opening 20 using the movable sashes 18. To facilitate containment of the potentially harmful materials within the fume hood 12, a negative pressure may be created in the interior of the housing and/or enclosure 22 (relative to the exterior of the housing and/or enclosure 22) by the ventilation system 14 (e.g., a fan, a blower, etc.) by drawing air through the fume hood opening 20 and exhausting the air through a ductwork 24 to an exterior of the building.

Proper airflow may be desirable to prevent harmful materials from exiting the fume hood through the opening 20 and into the space where personnel may be located. In some cases, the ventilation system 14 may include a filter (e.g., a HEPA filter, a ULPA filter, etc.) or other decontamination device (e.g., a scrubber) to help remove harmful materials and/or pathogens from the exhausted air. Proper control of airflow through the fume hood opening 20 may be important for safety, economic, comfort or other reasons. For example, if airflow through the fume hood opening 20 is too low (e.g., the face velocity of air flowing through the opening is too low), contaminants inside the fume hood 12 may have an opportunity to exit the fume hood 12 through the opening 20. This may present a safety issue. However, maintaining a high volume of airflow through the fume hood opening 20 at all times may be wasteful because unnecessarily large volumes of conditioned air (e.g., cooled or heated air) in the room may be drawn into the fume hood 12 and exhausted from the building. In such cases, additional air would need to be conditioned and supplied to the room to replace the exhausted air to maintain comfort in the room. By controlling the airflow of the fume hood 12, it has been found that airflow can be maintained at a level that helps ensure safe operation of the fume hood 12, while reducing costs associated with supplying conditioned air to the building where the fume hood 12 is installed. Further, energy required to drive the ventilation system 14 (e.g. fan) may be reduced, providing additional savings.

Depending on the application and/or installation, the fume hood 12 may be a bench-mounted fume hood, a floor-mounted fume hood, a portable fume hood, or any other type of fume hood. A bench-mounted fume hood may be installed such that the work surface is positioned at a standing-work height and may be used, for example, in an educational laboratory, an industrial laboratory, or a medical laboratory for limiting exposure to hazardous and/or noxious fumes, vapors, and/or dust. A floor-mounted (e.g., walk-in) fume hood may likewise be used in industrial, educational, or medical settings when large amounts of hazardous materials must be safely contained, while limiting exposure to hazardous and/or noxious fumes, vapors or dust. In some cases, a floor-mounted fume hood may be used to accommodate large amounts of hazardous material, larger equipment, and/or to facilitate access by a number of individuals. A portable fume hood may be used, for example, in settings where a permanently installed fume hood would not be practical, such as in laboratories having limited space and/or where a small containment area is needed, or for temporary or other short term use. In some instances, uses for a portable fume hood include, but are not limited to, chemical fume control, pharmaceutical compounding containment, soldering applications, light dust removal, biological applications, and other applications.

In some instances, the fume hood opening 20 is defined by one or more moveable sashes 18. The moveable sashes 18 may include panes, doors, strip curtains and/or other structure for enclosing the interior space of the fume hood 12. In some cases, the moveable sashes 18 may include a combination of panes, doors and/or strip curtains. For example, the moveable sashes 18 may be configured to open vertically, horizontally, or a combination of horizontally and vertically. In some cases, the fume hood 12 may be configured with one or more vertical moving sashes 18 and strip curtains affixed to the lower edge of the lowest vertical moving sash to allow access to the fume hood interior while still providing very significant containment. In some cases, the fume hood 12 may have two or more openings 20 defined by independently operating moveable sashes 18.

The ventilation system 14 may be configured to maintain an airflow through the fume hood 12. In some cases, the airflow may have a specified minimum airflow (e.g., when the moveable sashes 18 are fully closed), and a specified maximum airflow (e.g. when the moveable sashes 18 are fully open), such as to help ensure safe operation while reducing costs. In one example, the specified ventilation rates may be based on one or more industry standards provided by the American National Standards Institute (ANSI) and/or the American Industrial Hygiene Association (AIHA) (e.g., ANSI/AIHA Z9.5 Laboratory Ventilation), The Occupational Safety & Health Administration (OSHA) (e.g., OSHA Technical Manual, Section III: Chapter 3 Ventilation Investigation, OSHA Part 1910.1450), and/or The Scientific Equipment and Furniture Association (SEFA) (e.g., SEFA 1.2 Laboratory Fume Hoods Recommended Practices). Such standards define airflow requirements at the fume hood opening, typically specifying that the face velocities (e.g., air velocity through the fume hood opening 20) should remain within the range from about 60 feet per minute to about 125 feet per minute. Often, the recommended face velocity may depend on the relative toxicity and/or hazard of the materials within the fume hood 12 or the operations within the fume hood 12, or both.

In the example shown, the control system 16 includes one or more sensors 26, individually labeled as 26a, 26b and 26c. While a total of three sensors 26 are shown, it will be appreciated that this is merely illustrative, as the control system 16 may include any number of sensors 26. In some instances, at least some of the sensors 26 are configured to detect the presence of people near the fume hood 12. In some instances, at least some of the sensors 26 may include one or more of a Thermal MOS (TMOS) presence and motion sensor, a Time of Flight (TOF) multi-zone ranging sensor, and a mmWave radar sensor. In some instances, at least some of the sensors 26 may include one or more of a video camera, a PIR sensor, an ambient light sensor, and a gas sensor. These are just examples.

The sensors 26 are operatively coupled with a controller 28. In some instances, the controller 28 may include an Artificial Intelligence (AI) engine 30. A user interface 32 is operatively coupled with the controller 28. In some instances, the controller 28 may utilize the user interface 32 to display various information pertaining to operation of the fume hood 12 and the ventilation system 14. In some instances, the controller 28 may be configured to receive information entered by a user using the user interface 32. For example, a user may use the user interface 32 to enter configuration information relevant to operation of the fume hood 12 and/or the ventilation system 14. While shown schematically, it will be appreciated that at least some components of the control system 16, such as the sensors 26 and the user interface 32, may be mounted on the fume hood 12. The sensors 26 in particular may be mounted such that the sensors 26 have a field of view that includes a space in front of the fume hood 12 such that the sensors 26 can detect the presence of people in front of the fume hood 12, passing the fume hood 12 or walking towards or away from the fume hood 12.

FIGS. 2A and 2B are flow diagrams that together show an illustrative series of steps 34 that may be carried out by the controller 28 of FIG. 1. Put another way, the illustrative series of steps 34 illustrate steps that the controller 28 may be configured to carry out. In some instances, the controller 28 may be configured to determine a desired ventilation airflow rate for the fume hood 12 based at least in part on the one or more users detected by the one or more sensors 26, wherein the desired ventilation airflow rate corresponds to one of three or more available ventilation airflow rates, as indicated at block 36. The three or more available ventilation airflow rates may include a low airflow rate, a medium airflow rate and a high airflow rate, for example. In some cases, the available ventilation airflow rates are variable between a minimum available ventilation airflow rate and a maximum available ventilation airflow rate, with a plurality of intermediate available ventilation airflow rates between the minimum available ventilation airflow rate and the maximum available ventilation airflow rate. The number of intermediate available ventilation airflow rates may, for example, be 1, 2, 3, 4, 5, 10, 20 or more. The controller 28 may be configured to provide a control signal to the ventilation system 14, wherein the control signal corresponds to the desired ventilation airflow rate, as indicated at block 38.

In some instances, the controller 28 may be configured to determine a distance that each of one or more users detected by the one or more sensors 26 is from the fume hood 12, as indicated at block 40. The controller 28 may be configured to determine the desired ventilation airflow rate for the fume hood 12 based at least in part on the distance that one or more users detected by the one or more sensors 26 are from the fume hood 12, as indicated at block 42. For example, the desired ventilation airflow rate may have an inverse relationship with the distance that the one or more users are from the front of the fume hood 12.

In some instances, the controller 28 may be configured to determine a current activity of each of one or more users detected by the one or more sensors 26, wherein the current activity of a respective user is based at least in part on a current detection of the respective user and one or more past detections of the respective user, as indicated at block 44. In some instances, the current activity of a respective user may include one or more of walking past the fume hood 12 at a first distance from the fume hood 12, walking past the fume hood 12 at a second distance from the fume hood 12, wherein the second distance is larger than the first distance, walking toward the fume hood 12, standing a first distance from the fume hood 12, and standing a second distance from the fume hood 12, wherein the second distance is larger than the first distance. These are just examples. In some instances, the current activity of each of one or more users detected by the one or more sensors 26 includes one or more activity parameters including one or more of a current distance of the respective user from the fume hood 12, a current position of the respective user relative to the fume hood 12, a current speed of the respective user relative to the fume hood 12, a current direction of travel of the respective user relative to the fume hood 12, and a current direction that the respective user is facing relative to the fume hood 12. These are just examples.

In some instances, the controller 28 may be configured to determine a user activity profile based at least in part on the current activity of one or more users detected by the one or more sensors 26, as indicated at block 46. The controller 28 may be configured to determine a desired ventilation airflow rate for the fume hood 12 based at least in part on the user activity profile, as indicated at block 48. In some instances, the controller 28 may be configured to combine two or more of the activity parameters for one or more of the users to determine the desired ventilation airflow rate. In some instances, the AI engine 30 may combine two or more of the activity parameters for one or more of the users to determine the desired ventilation airflow rate for the fume hood 12. The AI engine 30 may be at least partially trained after the fume hood 12 is installed at an installation site to take into account site specific conditions and desired use cases.

The series of steps 34 continues in FIG. 2B, where the controller 28 may be configured to predict a future activity of one or more users based at least in part on one or more past detections of one or more users, as indicated at block 50. In some instances, the one or more sensors 26 may include two or more of a Thermal MOS (TMOS) presence and motion sensor, a Time of Flight (TOF) multi-zone ranging sensor, a mmWave radar sensor, a video camera, a PIR sensor, an ambient light sensor, and a gas sensor, as indicated at block 52. The controller 28 may be configured to determine a current activity of each of one or more users detected by the two or more sensors 26, as indicated at block 52a. The controller 28 may be configured to use sensor fusion to merge data from two or more of the sensors 26 to increase a confidence level in the determined current activity, as indicated at block 52b. This sensor fusion may be assisted by the AI engine 30. The controller 28 may be configured to determine the desired ventilation airflow rate for the fume hood 12 based at least in part on the determined current activity, as indicated at block 52c.

Figure 3:
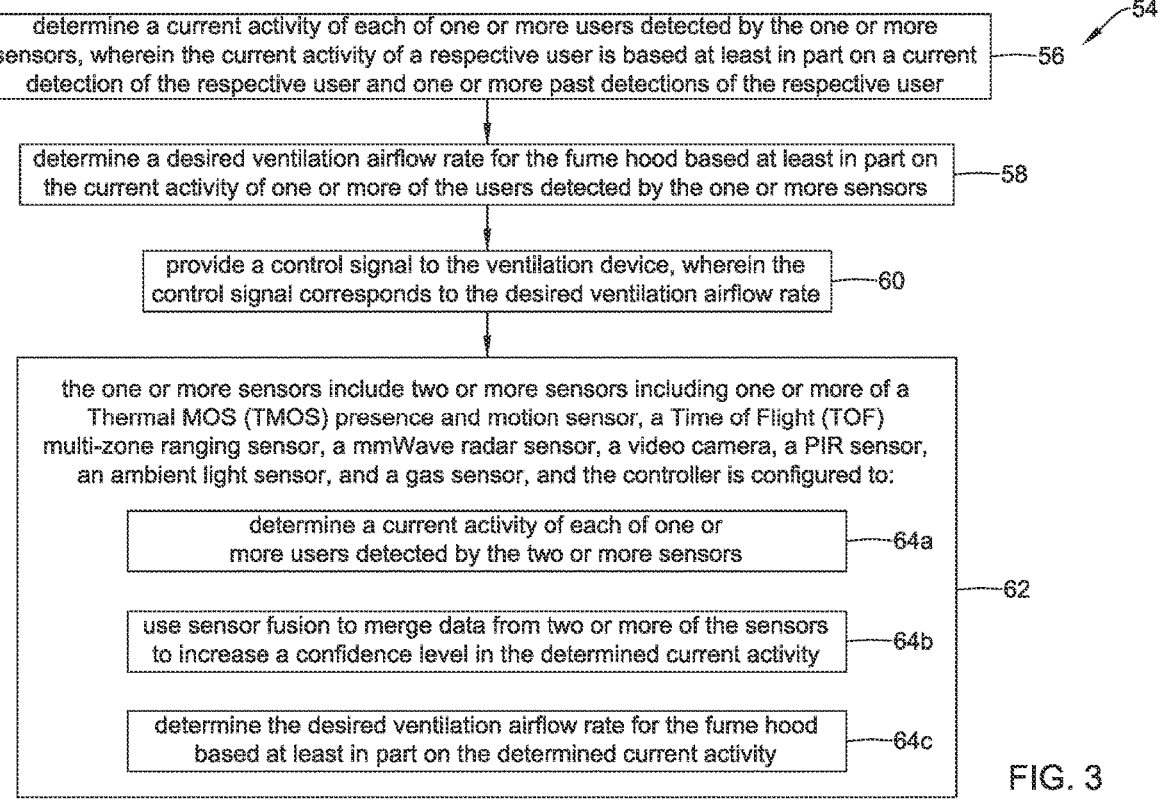
FIG. 3 is a flow diagram showing an illustrative series of steps that a controller forming part of the illustrative fume hood system of FIG. 1 may carry out.

FIG. 3 is a flow diagram showing an illustrative series of steps 54 that may be carried out by the controller 28. Put another way, the illustrative series of steps 54 illustrate steps that the controller 28 may be configured to carry out. In some instances, the controller 28 may be configured to determine a current activity of each of one or more users detected by the one or more sensors 26, wherein the current activity of a respective user is based at least in part on a current detection of the respective user and one or more past detections of the respective user, as indicated at block 56. In some instances, the current activity of a respective user may correspond to one or more of walking past the fume hood 12 at a first distance from the fume hood 12, walking past the fume hood 12 at a second distance from the fume hood 12, wherein the second distance is larger than the first distance, walking toward the fume hood 12, standing a first distance from the fume hood 12, and standing a second distance from the fume hood 12, wherein the second distance is larger than the first distance. These are just examples.

The controller 28 may be configured to determine a desired ventilation airflow rate for the fume hood 12 based at least in part on the current activity of one or more of the users detected by the one or more sensors 26, as indicated at block 58. The desired ventilation airflow rate may correspond to one of three or more available ventilation airflow rates. The controller 28 may be configured to provide a control signal to the ventilation system 14, wherein the control signal corresponds to the desired ventilation airflow rate, as indicated at block 60.

In some instances, the sensors 26 may include two or more of a Thermal MOS (TMOS) presence and motion sensor, a Time of Flight (TOF) multi-zone ranging sensor, a mmWave radar sensor, a video camera, a PIR sensor, an ambient light sensor, and a gas sensor, as indicated at block 62. The controller 28 may be configured to determine a current activity of each of one or more users detected by the two or more sensors 26, as indicated at block 62a. The controller 28 may be configured to use sensor fusion to merge data from two or more of the sensors 26 to increase a confidence level in the determined current activity, as indicated at block 62b. The controller 28 may be configured to determine the desired ventilation airflow rate for the fume hood 12 based at least in part on the determined current activity, as indicated at block 62c.

FIG. 4 is a flow diagram showing an illustrative series of steps 66 that may be carried out by the controller 28. Put another way, the illustrative series of steps 66 illustrate steps that the controller 28 may be configured to carry out. The controller 28 may be configured to apply sensor fusion to merge data from two or more of the sensors 26 to increase a confidence level in a detection of one or more of the users, as indicated at block 68. The sensor fusion may be assisted by the AI engine 30, although this is not required. The controller 28 may be configured to determine a desired ventilation airflow rate for the fume hood 12 based at least in part on the one or more users detected by the two or more sensors 26, as indicated at block 70. The controller 28 may be configured to provide a control signal to the ventilation system 14, wherein the control signal corresponds to the desired ventilation airflow rate, as indicated at block 72. In some instances, the controller 28 may be configured to repeatedly adjust the desired ventilation airflow rate between three more available ventilation airflow rates based on detected changes in the current activity over time, as indicated at block 74.

In some instances, the sensors 26 may include two or more of a Thermal MOS (TMOS) presence and motion sensor, a Time of Flight (TOF) multi-zone ranging sensor, a mmWave radar sensor, a video camera, a PIR sensor, an ambient light sensor, and a gas sensor. The controller 28 may be configured to determine a current activity of each of one or more users detected by the two or more sensors 26. The controller 28 may be configured to use sensor fusion to merge data from two or more of the sensors 26 to increase a confidence level in the determined current activity. The controller 28 may be configured to determine the desired ventilation airflow rate for the fume hood 12 based at least in part on the determined current activity of each of one or more users detected by the two or more sensors 26.

Figure 5:
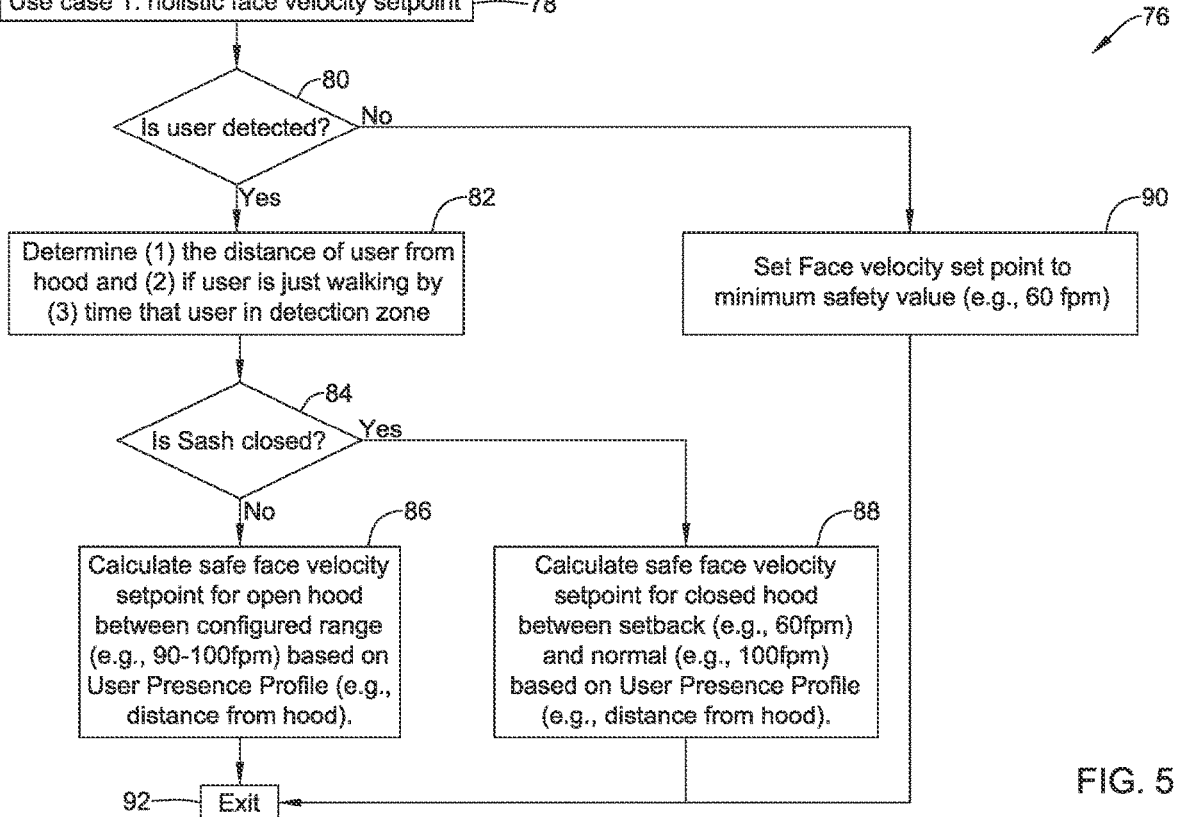
FIG. 5 is a flow diagram showing an illustrative method.

FIG. 5 is a flow diagram of an illustrative method 76 showing a use case for setting a holistic face velocity setpoint. Rather than a binary decision YES/NO regarding the presence of a user, a user presence profile may be generated and used to continuously adjust the face velocity profile in order to achieve a balance between energy savings and user safety. Key parameters may include a sensed zone presence profile that includes a number of detected users, the distance of each detected user from a front of the fume hood, and the movement and direction of movement for each of the detected users. In some instances, this may include the outputs from a deep learning algorithm running on the AI engine 30. Key parameters may also include sash position feedback, such as whether the sash is open or closed, and if open, at what percentage. Key configuration parameters may include a safe distance from the fume hood (such as 3 feet), the face velocity setpoint range from a closed hood and a face velocity setpoint range from an open fume hood. These are just examples.

The illustrative method 76 begins with user case 1, which is determining a holistic face velocity setpoint, as indicated at block 78. At decision block 80, a determination is made as to whether a user has been detected. If yes, control passes to block 82, where the following are determined: (1) the distance of the user from the hood; (2) whether the user is just walking by; and (3) the time that the user has been or is projected to remain in the detection zone. At decision block 84, a determination is made as to whether the sash is closed. If yes, control passes to block 88, where a safe face velocity for a closed hood is determined based on, for example, a distance of the user from the fume hood. Otherwise, control passes to block 86 and a safe face velocity for an open hood is determined based on, for example, a distance of the user from the fume hood. From blocks 86 and 88, control passes to an exit block 92. If no user is detected at decision block 80, control passes to block 90 where the face velocity set point is set equal to a minimum safety value. From there, control passes to the exit block 92.

Figure 6:
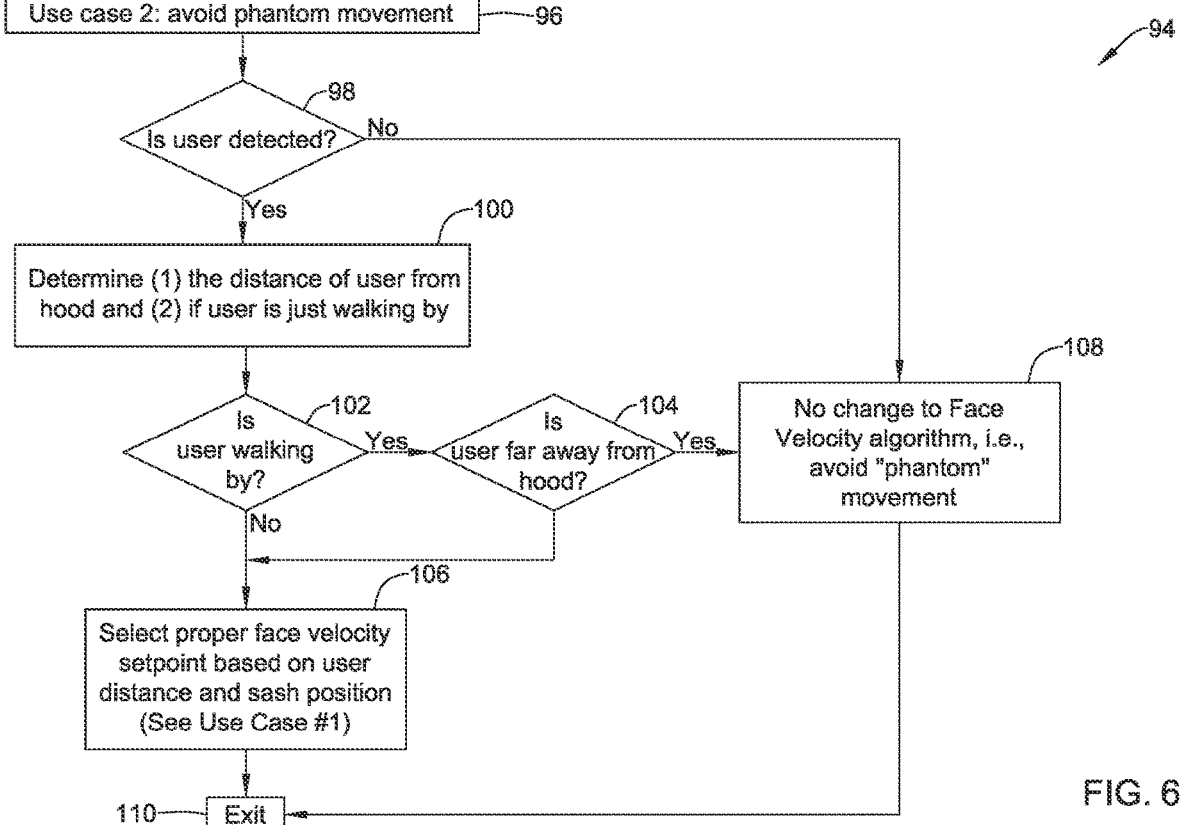
FIG. 6 is a flow diagram showing an illustrative method.

FIG. 6 is a flow diagram of an illustrative method 94 showing a use case for avoiding phantom movement. When the sash is closed, the face velocity is generally kept low (e.g., 60 feet per minute). When a user is detected, rather than immediately increasing the face velocity to a normal level (e.g., 100 feet per minute), the system determines whether the detected user is simply walking by the fume hood. Key parameters may include a sensed zone presence profile that includes a number of detected users, the distance of each detected user from a front of the fume hood, and the movement and direction of movement for each of the detected users. In some instances, this may include outputs from a deep learning algorithm running on the AI engine 30. Key parameters may also include sash position feedback, such as whether the sash is open or closed, and if open, at what percentage. Key configuration parameters may include a safe distance from the fume hood (such as 3 feet) and a range of speeds that is used to determine how long a user walking by would remain in the detection zone.

The method 94 begins with user case #2, as seen at block 92. Control passes to a decision block 98, where a determination is made as to whether a user has been detected. If so, control passes to block 100, where (1) a distance of the user from the hood and (2) whether the detected user is simply walking by is determined. At a decision block 102, a determination is made as to whether the detected user is simply walking by. If yes, control passes to a decision block 104 where a determination is made as to whether the user is far away (e.g. more than a predetermined threshold) from the fume hood. If yes, control passes to block 108, where no change is made to the face velocity of the fume hood 12. Control then passes to an exit block 110. If the detected user is determined to not be walking by the fume hood, at decision block 102, or if the detected user is determined to not be far away (e.g. nor more than the predetermined threshold) from the fume hood 12, at decision block 104, control passes to block 106, where the proper face velocity is selected based on user distance and sash position, as shown in FIG. 5. Control then passes to the exit block 110.

Figure 7:
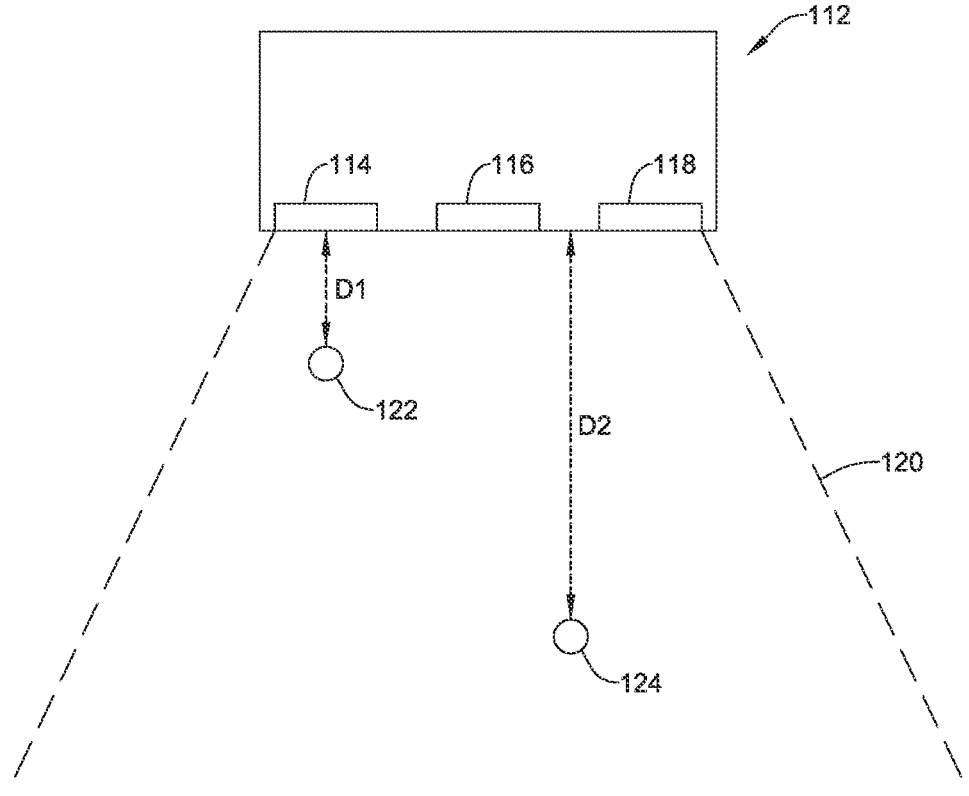
FIG. 7 is an overhead schematic view of an illustrative use case.

FIGS. 7 through 10 are schematic illustrations of various use cases, showing examples of where detected users may be in front of a fume hood, and what direction they may be moving in. In FIG. 7, an overhead view of a fume hood 112 is schematically shown. It will be appreciated that this is a top view of the fume hood 112, such that it is easy to envision the position and velocity (including direction) of people in front of the fume hood 112. The fume hood 112 may be considered as being an example of the fume hood 12. The fume hood 112 includes several sensors 114, 116 and 118 that are schematically shown atop the fume hood 112. While three sensors 114, 116 and 118 are shown, in some cases the fume hood 112 may include additional sensors or may include fewer than three sensors. The sensors 114, 116 and 118 may be disposed in any of a variety of different positions, as long as the sensors 114, 116 and 118 collectively have a field of view 120 in which any people will be detected. The sensors 114, 116 and 118 may include one or more of a Thermal MOS (TMOS) presence and motion sensor, a Time of Flight (TOF) multi-zone ranging sensor, and a mmWave radar sensor. In some instances, the sensors 114, 116 and 118 may include one or more of a video camera, a PIR sensor, an ambient light sensor, and a gas sensor. These are just examples.

Figure 8:
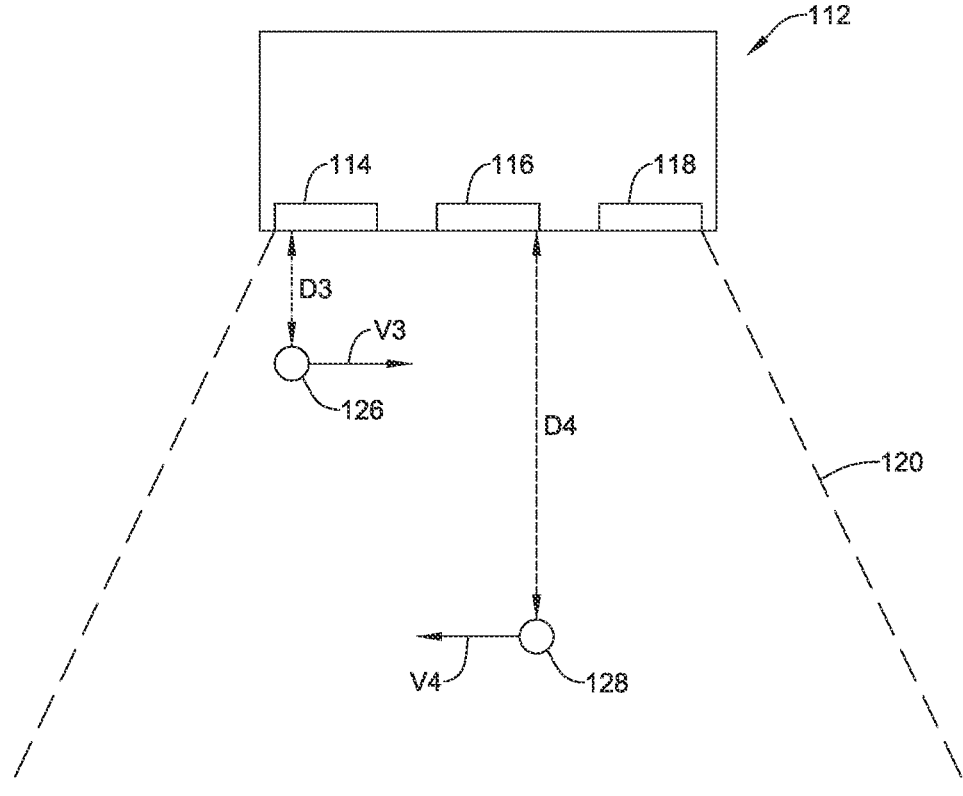
FIG. 8 is an overhead schematic view of an illustrative use case.
Figure 9:
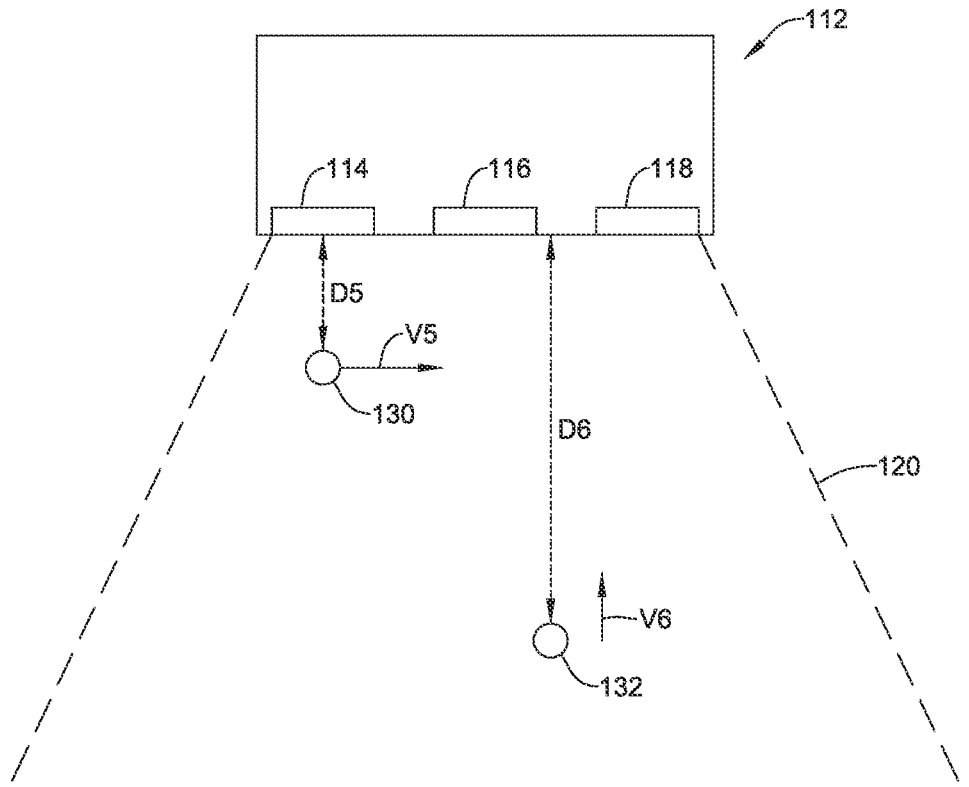
FIG. 9 is an overhead schematic view of an illustrative use case.
Figure 10:
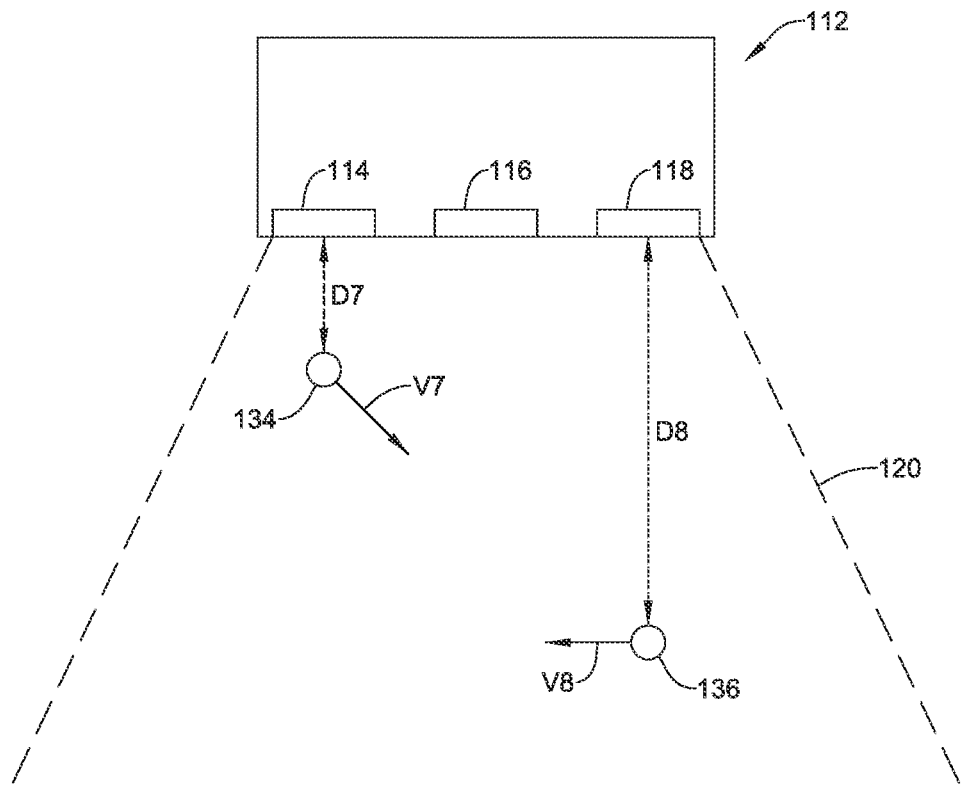
FIG. 10 is an overhead schematic view of an illustrative use case.

In FIG. 7, a first person 122 is seen standing a distance D1 from the front of the fume hood 112 and a second person 124 is seen standing a distance D2 from the front of the fume hood 112. In FIG. 8, a first person 126 is moving right to left (from the perspective of the fume hood 112) with a velocity V3 and is currently at a distance D3 from the front of the fume hood and a second person 128 is moving left to right (from the perspective of the fume hood 112) with a velocity V4 and is currently at a distance D4 from the front of the fume hood. In FIG. 9, a first person 130 is moving left to right (from the perspective of the fume hood 112) with a velocity V5 and is currently at a distance D5 from the front of the fume hood and a second person 132 is moving towards the fume hood 112 with a velocity V6 and is currently at a distance D6 from the fume hood 112. In FIG. 10, a first person 134 is moving diagonally away from the front of the fume hood 112 with a velocity V7 and is currently at a distance D7 from the front of the fume hood 112 and a second person 136 is moving left to right (from the perspective of the fume hood 112) with a velocity V8 and is currently at a distance of D8 from the front of the fume hood 112. It will be appreciated that D1, D2, D3, D4, D5, D6, D7 and D8 are distances, and thus indicate a current position relative to the front of the fume hood 112. Moreover, V3, V4, V5, V6, V7 and V8 are velocities. As velocity is a vector, velocity indicates both a speed of movement and a direction of movement.

It is contemplated that the sensors 114, 116 and 118 may be configured to sense and a controller may be configured to determine a current activity of each of one or more users detected by the sensors 114, 116 and 118. The current activity of a respective user may be based at least in part on a current detection of the respective user and one or more past detections of the respective user. In some instances, the current activity of a respective user may include one or more of walking past the fume hood 112 at a first distance from the fume hood 112, walking past the fume hood 112 at a second distance from the fume hood 112, wherein the second distance is larger than the first distance, walking toward the fume hood 112, standing a first distance from the fume hood 112, and standing a second distance from the fume hood 112, wherein the second distance is larger than the first distance. These are just examples. In some instances, the current activity of each of one or more users detected by the sensors 114, 116 and 118 includes one or more activity parameters including one or more of a current distance of the respective user from the fume hood 112, a current position of the respective user relative to the fume hood 112, a current speed of the respective user relative to the fume hood 112, a current direction of travel of the respective user relative to the fume hood 112, and a current direction that the respective user is facing relative to the fume hood 112. These are just examples.

In some instances, a controller may be configured to determine a user activity profile based at least in part on the current activity of one or more users detected by the sensors 114, 116 and 118. The controller may be configured to determine a desired ventilation airflow rate for the fume hood 112 based at least in part on the user activity profile. In some instances, the controller may be configured to combine two or more of the activity parameters for one or more of the users to determine the desired ventilation airflow rate. In some instances, an AI engine may combine two or more of the activity parameters for one or more of the users to determine the desired ventilation airflow rate for the fume hood 112. The AI engine (e.g. AI engine 30) may be at least partially trained after the fume hood 112 is installed at an installation site to take into account site specific conditions and desired use cases.

Having thus described several illustrative embodiments of the present disclosure, those of skill in the art will readily appreciate that yet other embodiments may be made and used within the scope of the claims hereto attached.

What is claimed is:

1. A system for controlling a ventilation device of a fume hood, the system comprising:

one or more sensors configured to detect one or more users in front of the fume hood;

a controller operatively coupled to the one or more sensors, the controller configured to:

determine a current activity of each of one or more users detected by the one or more sensors based on a current detection of a respective user and one or more past detections of the respective user;

determine a user activity profile based on the current activity of the each of the one or more users detected by the one or more sensors;

determine a desired ventilation airflow rate for the fume hood based on the one or more users detected by the one or more sensors, a sash position of a sash of the fume hood, and the user activity profile, wherein the desired ventilation airflow rate corresponds to one of three or more available ventilation airflow rates; and provide a control signal to the ventilation device, wherein the control signal corresponds to the desired ventilation airflow rate.

2. The system of claim 1, wherein the controller is configured to:

determine a distance that each of one or more users detected by the one or more sensors from the fume hood; and determine the desired ventilation airflow rate for the fume hood based at least in part on the distance that the each of the one or more users detected by the one or more sensors are from the fume hood.

3. The system of claim 1, wherein the current activity of the respective user corresponds to one of:

walking past the fume hood at a first distance from the fume hood;

walking past the fume hood at a second distance from the fume hood, wherein the second distance is larger than the first distance;

walking toward the fume hood;

standing a first distance from the fume hood; and standing a second distance from the fume hood, wherein the second distance is larger than the first distance.

4. The system of claim 1, wherein the current activity of the each of the one or more users detected by the one or more sensors include activity parameters including at least one of:

a current distance of the respective user from the fume hood;

a current position of the respective user relative to the fume hood;

a current speed of the respective user relative to the fume hood;

a current direction of travel of the respective user relative to the fume hood; and a current direction that the respective user is facing relative to the fume hood.

5. The system of claim 4, wherein the controller is configured to combine, in response to the activity parameters including two or more activity parameters, the two or more activity parameters for the each of the one or more users to determine the desired ventilation airflow rate.

6. The system of claim 5, wherein the controller includes an Artificial Intelligence (AI) engine that combines two or more of the activity parameters for the each of the one or more users to determine the desired ventilation airflow rate.

7. The system of claim 6, wherein the AI engine is at least partially trained after the fume hood is installed at an installation site.

8. The system of claim 1, wherein the controller is configured to predict a future activity of the each of the one or more users based at least in part on the one or more past detections of the respective user.

9. The system of claim 1, wherein the one or more sensors comprises one or more of a Thermal MOS (TMOS) presence and motion sensor, a Time of Flight (TOF) multi-zone ranging sensor, and a mmWave radar sensor.

10. The system of claim 9, wherein the one or more sensors further comprises one or more of a video camera, a PIR sensor, an ambient light sensor, and a gas sensor.

11. The system of claim 1, wherein the one or more sensors include one or more of a Thermal MOS (TMOS) presence and motion sensor, a Time of Flight (TOF) multi-zone ranging sensor, a mmWave radar sensor, a video camera, a PIR sensor, an ambient light sensor, and a gas sensor, and the controller is configured to:

determine a current activity of each of the one or more users detected by the two or more sensors;

use sensor fusion to merge data from the two or more sensors to increase a confidence level in the determined current activity; and determine the desired ventilation airflow rate for the fume hood based at least in part on the determined current activity.

12. A system for controlling a ventilation device of a fume hood, the system comprising:

one or more sensors configured to detect one or more users in front of the fume hood;

a controller operatively coupled to the one or more sensors, the controller configured to:

determine a current activity of each of the one or more users detected by the one or more sensors based on a current detection of the respective user and one or more past detections of the respective user;

determine a user activity profile based on the current activity of the each of the one or more users detected by the one or more sensors;

determine a desired ventilation airflow rate for the fume hood based on the current activity of the respective user detected by the one or more sensors, a sash position of a sash of the fume hood, and the user activity profile; and provide a control signal to the ventilation device, wherein the control signal corresponds to the desired ventilation airflow rate.

13. The system of claim 12, wherein the current activity of the respective user corresponds to one of:

walking past the fume hood at a first distance from the fume hood;

walking past the fume hood at a second distance from the fume hood, wherein the second distance is larger than the first distance;

walking toward the fume hood;

standing a first distance from the fume hood; and standing a second distance from the fume hood, wherein the second distance is larger than the first distance.

14. The system of claim 12, wherein the one or more sensors include one or more of a Thermal MOS (TMOS) presence and motion sensor, a Time of Flight (TOF) multi-zone ranging sensor, a mmWave radar sensor, a video camera, a PIR sensor, an ambient light sensor, and a gas sensor, and the controller is configured to:

determine a current activity of each of the one or more users detected by the two or more sensors;

use sensor fusion to merge data from the two or more sensors to increase a confidence level in the determined current activity; and determine the desired ventilation airflow rate for the fume hood based at least in part on the determined current activity.

15. The system of claim 12, wherein the desired ventilation airflow rate corresponds to one of three or more available ventilation airflow rates.

16. A system for controlling a ventilation device of a fume hood, the system comprising:

two or more sensors configured to detect one or more users in front of the fume hood;

a controller operatively coupled to the two or more sensors, the controller configured to:

apply sensor fusion to merge data from the two or more sensors to increase a confidence level in a detection of the one or more users;

determine a current activity of each of the one or more users detected by the one or more sensors based on a current detection of a respective user and one or more past detections of the respective user;

determine a user activity profile based on the current activity of the each of the one or more users detected by the one or more sensors;

determine a desired ventilation airflow rate for the fume hood based on the one or more users detected by the two or more sensors, a sash position of a sash of the fume hood, and the user activity profile; and provide a control signal to the ventilation device, wherein the control signal corresponds to the desired ventilation airflow rate.

17. The system of claim 16, wherein the two or more sensors including one or more of a Thermal MOS (TMOS) presence and motion sensor, a Time of Flight (TOF) multi-zone ranging sensor, a mmWave radar sensor, a video camera, a PIR sensor, an ambient light sensor, and a gas sensor, and the controller is configured to:

determine a current activity of each of the one or more users detected by the two or more sensors;

apply sensor fusion to merge data from the two or more sensors to increase a confidence level in the determined current activity; and determine the desired ventilation airflow rate for the fume hood based at least in part on the determined current activity.

18. The system of claim 16, wherein the controller is configured to repeatedly adjust the desired ventilation airflow rate between three or more available ventilation airflow rates based on detected changes in the current activity over time.

* * * * *